M. VEGH.
MILK BOILER.
APPLICATION FILED JUNE 16, 1919.

1,322,846.

Patented Nov. 25, 1919.

Inventor
M. Vegh

By NM Wilson

Attorney

UNITED STATES PATENT OFFICE.

MICHAEL VEGH, OF BRIDGEPORT, CONNECTICUT.

MILK-BOILER.

1,322,846.   Specification of Letters Patent.   Patented Nov. 25, 1919.

Application filed June 16, 1919. Serial No. 304,536.

*To all whom it may concern:*

Be it known that I, MICHAEL VEGH, a citizen of Hungary, residing at Bridgeport, in the county of Fairfield and State of Connecticut, have invented certain new and useful Improvements in Milk-Boilers, of which the following is a specification.

The primary object of the invention is the provision of a boiler for milk that is easy and inexpensive to manufacture and of great service as a kitchen article as well as being ornamental in appearance and having other uses than the boiling of milk.

A further object of the invention is to provide a two-part milk boiler serviceable for boiling purposes while each part of the device may be separately employed for other uses, one of the same being in the form of a funnel when inverted and the other a cooker for general uses.

With these general objects in view the invention consists of the combination and arrangement of parts hereinafter fully described, illustrated in the accompanying drawing and then claimed.

Figure 1:
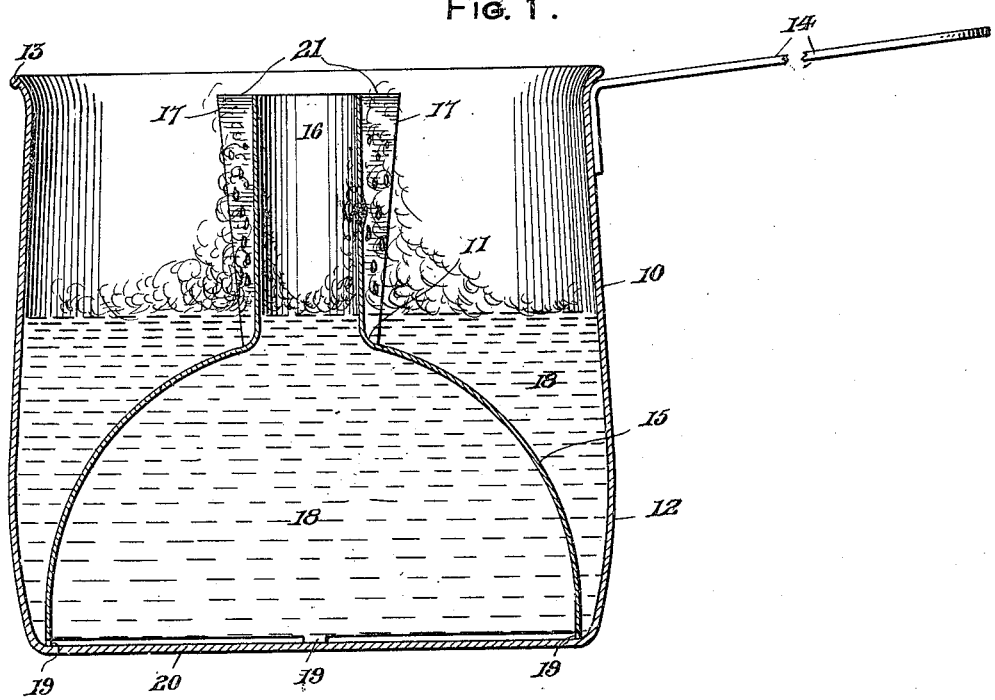
Figure 2:
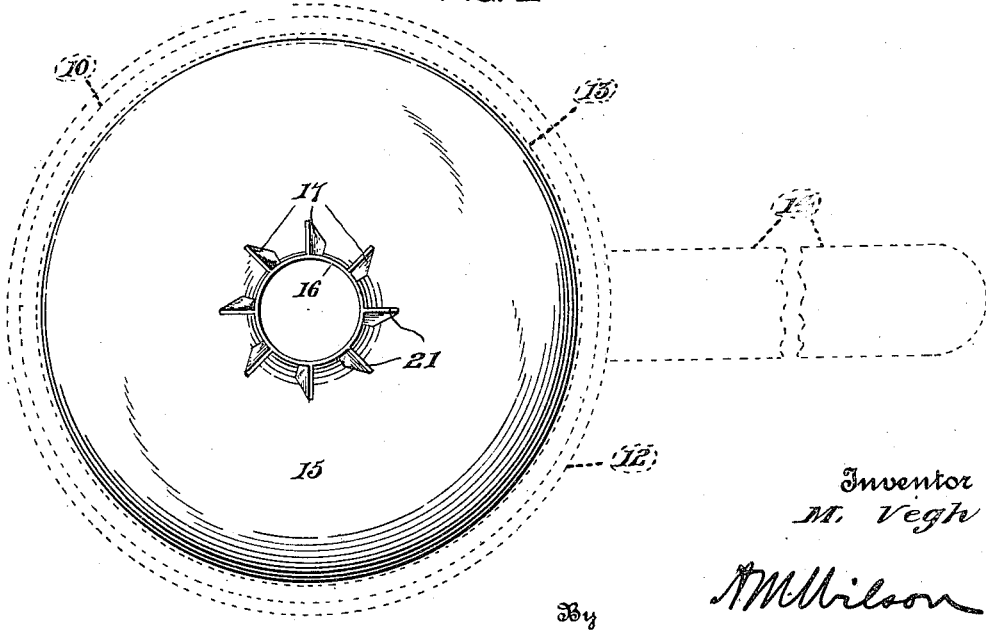

In the drawing, like reference numerals designate corresponding parts throughout the several views, and Figure 1 is a vertical central sectional view through the invention, and Fig. 2 is a top plan view thereof with the outer one of the members illustrated by dotted lines.

It is desirable in the boiling of milk to prevent an overflow of the fluid and my invention accomplishes this result by providing a receptacle or kettle 10 for receiving the milk and having an inverted funnel-shaped member 11 seated therein. The receptacle 10 has slightly flaring sides 12, and a flaring rim 13, as well as a handle 14 attached to the receptacle rim.

The member 11 being hollow and formed of sheet metal, comprises a substantially hemispherical portion or base 15, with a tube or neck 16 radially projecting from the pole or axis thereof, a plurality of inclined blades or fins 17 being exteriorly mounted on the neck 16 tapered toward other points of merging with the base 15. The member 11 is positioned in the receptacle 10 when desired to boil fluid such as milk 18, depending lugs or feet 19 of the member 11 being seated upon the bottom 20 of the receptacle 10.

The receptacle 10 being positioned for heating purposes, the milk 18 is raised to the boiling point and becoming agitated, the boiling milk rises through the centrally positioned tube 16 flowing out of the top thereof downwardly in contact with the fins 17 and returning to the milk in the receptacle 10.

As illustrated, the fins 17 increase in size upwardly, so that at the point spaced farthest from the boiling fluid, the fins have greater radiating surfaces, thus to present cooler portions at the extreme upper end of the tube 16 whereby fluid boiling over the neck of the tube will contact the fins 17 at their upper ends and be cooled to insure the return to the receptacle 10. Also, the fins tend to radiate heat from the upper end of the tube 16, somewhat to chill the boiling fluid at this point and condense vapor adjacent thereto. Inasmuch, as the fins are obliquely arranged, the fluid returning to the receptacle is caused to travel over the fins so as partially to cool the returning fluid immediately upon returning to the boiling contents of the receptacle.

The member 11 is readily removed from the receptacle 10 and the latter serviceable for any uses desired, such as cooking, while the member 11 upon being inverted may be employed as a funnel and may be positioned upright surrounding an opening by standing the same upon the free end of the tube 16 and the enlarged ends 21 of the fins 17.

While the form of the invention herein set forth is believed to be preferable, it will be understood that minor changes may be made therein without departing from the spirit and scope of the invention as claimed.

What I claim as new is:

1. A milk boiler comprising a receptacle, an inverted funnel-shaped member mounted in the receptacle upon the bottom thereof, having an upwardly extending neck axially of the receptacle and spaced triangular-shaped fins exteriorly of the neck inclined toward their point of merger with the flaring portion of said funnel-shaped member.

2. A milk boiler comprising a receptacle having a bottom and a top rim, a funnel-shaped member comprising a hemispherical base and a radially carried tube, feet upon the base mounted upon the bottom of the receptacle when positioned for use, with the tube upwardly extending centrally of the latter terminating beneath the plane of said rim and spaced fins obliquely mounted exteriorly of the tube tapering toward the base adapted for directing the flow of milk when used as a boiler.

3. A milk boiler comprising a receptacle having a bottom and top rim, a funnel-shaped member comprising a hemispherical base and a radially carried tube, feet upon the base mounted upon the bottom of the receptacle when positioned for use, with the tube upwardly extending centrally of the latter terminating beneath the plane of said rim, spaced fins obliquely mounted exteriorly of the tube tapering toward the base adapted for directing the flow of milk when used as a boiler, the open free end of the tube and the adjacent wider ends of the fins being adapted for supporting the funnel-shaped member when used as a funnel independently of said receptacle and a handle projecting from the receptacle adjacent said rim.

4. In a milk boiler, a receptacle and a milk deflector adapted for positioning therein, the said deflector being hollow with a hemispherical base and a tube axially projecting from the base, depending feet upon the open end of the base adapted for seating upon the bottom of the receptacle and tapered fins carried by the tube in spaced oblique relations terminating flush with the open free end of the tube when the device is in use with the tube axially positioned in the receptacle and its free end beneath the level of the mouth of the receptacle.

5. A milk boiler member comprising a hemispherical hollow base, a tubular neck centrally projecting outwardly of the base, supporting feet upon the open end of the base, and a plurality of triangular fins obliquely carried exteriorly of the tube with their engaged ends in the plane of the open mouth of the tube and their opposite ends merging with the adjacent portion of the base.

In testimony whereof I affix my signature.

MICHAEL VEGH.